No. 609,820. Patented Aug. 30, 1898.
H. J. LECONTE & H. M. GOURRIER.
MANUFACTURE OF STAMPED WHEELS FOR TOYS OR THE LIKE.
(Application filed Dec. 19, 1896.)
(No Model.)

Witnesses:
L. M. Wachschlager
Geo. C. Moore

Inventors
Hippolyte Jules Leconte,
Hilaire Macaire Gourrier,
By Briesen & Knauth
their Attorneys.

THE NORRIS PETERS CO., PHOTO-LITHO., WASHINGTON, D. C.

UNITED STATES PATENT OFFICE.

HIPPOLYTE JULES LECONTE AND HILAIRE MACAIRE GOURRIER, OF PARIS, FRANCE.

MANUFACTURE OF STAMPED WHEELS FOR TOYS OR THE LIKE.

SPECIFICATION forming part of Letters Patent No. 609,820, dated August 30, 1898.

Application filed December 19, 1896. Serial No. 616,269. (No model.) Patented in France July 11, 1896, No. 258,005, and in Belgium July 17, 1896, No. 122,553.

*To all whom it may concern:*

Be it known that we, HIPPOLYTE JULES LECONTE and HILAIRE MACAIRE GOURRIER, both of the city of Paris, France, have invented a new Manufacture of Stamped Wheels for Toys or the Like, (for which we have obtained Letters Patent in France for fifteen years, dated July 11, 1896, No. 258,005, and in Belgium for fifteen years, dated July 17, 1896, No. 122,553,) of which the following is a full, clear, and exact description.

The invention which forms the subject of the present application for Letters Patent relates to a new industrial product consisting of a wheel stamped out in one piece with its hub. The wheel is chiefly applicable to toys, although it may be applied to other articles, such as small mechanism, cheap clockwork, &c.

In order that the invention may be understood, it is illustrated by way of example in the accompanying drawings, in which—

Figure 1:
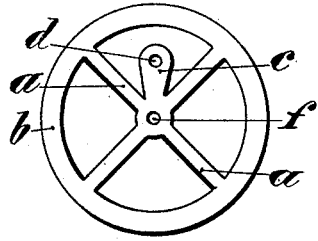
Figure 2:
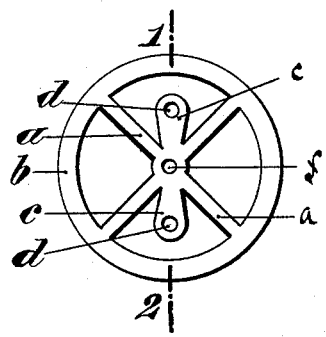
Figure 3:
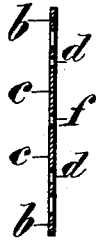
Figure 4:
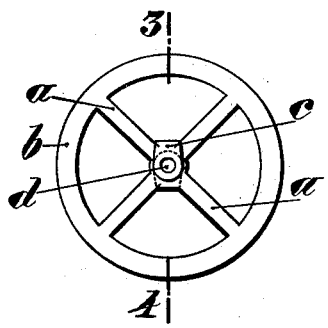
Figure 5:
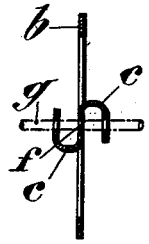
Figure 6:
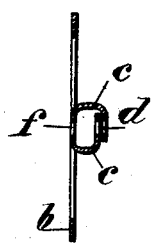
Figure 7:
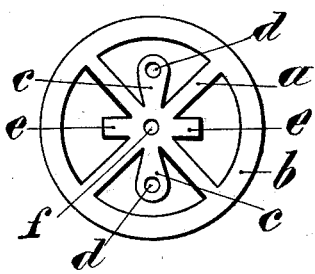
Figure 8:
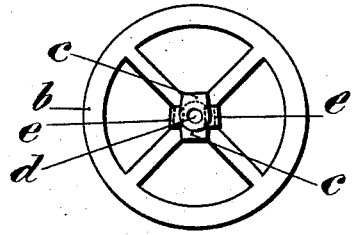
Figure 10:
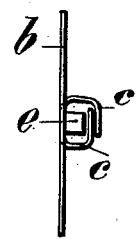
Figure 9:
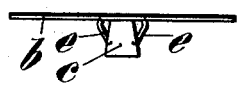

Figure 1 represents a face view of a wheel as stamped out in one piece with its hub. Fig. 2 is a modification. Fig. 3 is a cross-section on line 1 2, Fig. 2. Fig. 4 shows the same wheel with the parts forming the hub folded over at opposite sides of the wheel. Fig. 5 is a cross-section thereof on line 3 4 of Fig. 4. Fig. 6 is a cross-section showing the parts which form the hub folded down on the same face of the wheel. Fig. 7 shows a face view of another modification of a wheel stamped out in a single piece with its hub. Fig. 8 is a face view of the same wheel having the parts to form the hub bent down on the same side. Fig. 9 is a plan, and Fig. 10 an edge view, of the same.

The same letters of reference denote like parts in all the figures.

As shown in the drawings, the wheel $b$ is stamped out with one or more ears $c$ between the spokes $a$. The lugs or ears $c$, formed in one with the wheel, have each a hole in it and form the hub when folded down on each side of the wheel, as in Figs. 3 and 4, or on one side only, as in Fig. 5. The hub may be strengthened by means of lugs or ears $e$ $e$, which, like the lugs or ears $c$, are stamped out and turned down, as shown in Figs. 8 and 9. The holes $d$ and $f$, formed in the wheel at the time of stamping, are brought opposite each other when the ears are folded, so as to receive the spindle $g$ of the wheel. The number of lugs or ears $c$ constituting the hub of the wheel may be varied, and the ear or ears may be turned down upon one or other or upon both faces of the wheel.

The form, dimensions, and materials employed in the construction of the combined wheel and hub may be varied without in any way departing from the principle of the invention, it being understood, however, that the material employed in the construction of the wheel must for the purposes of this invention be the equivalent of sheet metal.

We claim—

1. A one-piece sheet-metal wheel, comprising a rim $b$, spokes $a$, perforated lugs $c$ extending from the center of the wheel between the spokes and bent over upon opposite sides of the wheel to bring their perforations $d$ in line with each other and with the central perforation $f$ of the wheel and strengthening-ears $e$, against which the perforated lugs $c$ are adapted to bear.

2. In a sheet-metal wheel, the combination of a rim $b$, spokes $a$, a plurality of ears $c$ provided with apertures $d$ and extending from the center of the wheel in radial directions and bent over to bring their apertures in line with each other and with the central aperture $f$ of the wheel and strengthening-ears $e$ forming a brace or support for the ears $c$.

The foregoing specification of our new manufacture of stamped wheels for toys or the like signed by us this 23d day of November, 1896.

HIPPOLYTE JULES LECONTE.
HILAIRE MACAIRE GOURRIER.

Witnesses:
EDWARD P. MACLEAN,
ALBERT MOREAU.